(12) United States Patent
Kahn et al.

(10) Patent No.: US 9,144,009 B2
(45) Date of Patent: Sep. 22, 2015

(54) METHOD AND APPARATUS FOR CONTROLLING WIRELESS ACCESS SELECTION

(75) Inventors: Colin Kahn, Morris Plains, NJ (US); Sankaranarayanan Sathyanarayan, Stewartsville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 449 days.

(21) Appl. No.: 13/110,727

(22) Filed: May 18, 2011

(65) Prior Publication Data

US 2012/0294293 A1 Nov. 22, 2012

(51) Int. Cl.
   H04W 4/00       (2009.01)
   H04W 48/14      (2009.01)
   H04W 48/18      (2009.01)
   H04W 48/16      (2009.01)

(52) U.S. Cl.
   CPC .............. *H04W 48/14* (2013.01); *H04W 48/18* (2013.01); *H04W 48/16* (2013.01)

(58) Field of Classification Search
   USPC .......... 370/329, 331, 353, 354; 455/436, 439, 455/442, 33.2
   See application file for complete search history.

(56) References Cited

U.S. PATENT DOCUMENTS

| 5,214,789 | A  | * | 5/1993 | George ........................ 455/440 |
| 2004/0156372 | A1 |   | 8/2004 | Hussa |
| 2004/0165563 | A1 | * | 8/2004 | Hsu et al. ...................... 370/338 |
| 2004/0176024 | A1 | * | 9/2004 | Hsu et al. ..................... 455/3.04 |
| 2005/0100028 | A1 | * | 5/2005 | Knauerhase et al. ......... 370/401 |
| 2006/0035636 | A1 |   | 2/2006 | Pirila |
| 2006/0221917 | A1 |   | 10/2006 | McRae |
| 2007/0140189 | A1 |   | 6/2007 | Muhamed et al. |
| 2010/0067434 | A1 |   | 3/2010 | Siu et al. |

FOREIGN PATENT DOCUMENTS

| EP | 1 560 369 A2 | 8/2005 |
| EP | 1 763 266 A1 | 3/2007 |

OTHER PUBLICATIONS

The International Search Report and the Written Opinion of the International Searching Authority, or the Declaration in PCT/US2012/037425, mailed Aug. 12, 2007, Alcatel-Lucent Usa Inc., Applicant, 12 pages.
3GPP TS 23.402 V8.4.1 (Jan. 2009), $3^{rd}$ Generation Partnership Project; Technical Specification Group Services and System Aspects; Architecture Enhancements for non-3GPP Accesses (Release 8).

* cited by examiner

*Primary Examiner* — Zewdu A Beyen
(74) *Attorney, Agent, or Firm* — Wall & Tong, LLP (57) ABSTRACT

An wireless access selection capability is disclosed. In at least some embodiments, the wireless access selection capability enables a wireless user terminal to determine, via interaction with a mobility network (e.g., a 3G cellular network, a 4G cellular network, and the like), whether to remain connected via the mobility network or to connect via a Wireless Local Area Network (WLAN). The interaction may be in the form of two queries initiated by the wireless user terminal, including a first query for determining whether the wireless user terminal should perform a scan for identifying WLANs available for providing wireless access to the wireless user terminal and a second for determining whether the wireless user terminal should switch from being connected to the mobility network to being connected to an identified WLAN identified during a scan initiated by the wireless user terminal.

16 Claims, 4 Drawing Sheets

METHOD AND APPARATUS FOR CONTROLLING WIRELESS ACCESS SELECTION

TECHNICAL FIELD

The invention relates generally to communication networks and, more specifically but not exclusively, to enabling selection of wireless access for wireless user terminals.

BACKGROUND

Many mobile user devices are configured to make real-time decisions to select between mobility networks (e.g., Third Generation (3G) Partnership Project (3GPP) networks, 3GPP2 networks, and the like) and Wireless Local Area Networks (WLANs); however, the decision by a mobile user device as to whether to select a mobility network or a WLAN is typically based on static information that is available on the mobile user device.

SUMMARY

Various deficiencies in the prior art are addressed by embodiments for supporting wireless access selection for a wireless user terminal.

In one embodiment, an apparatus includes a processor and a memory, the processor configured to: send, from a wireless user terminal (WUT) toward a network element via a mobility network, a first query for determining whether the WUT should perform a scan for identifying Wireless Local Area Networks (WLANs) available for providing wireless access to the WUT; initiate, based at least in part on a first query response indicative that the WUT should perform a scan for identifying WLANs, a scan for identifying one or more WLANs available for providing wireless access to the WUT; and send, from the WUT toward the network element via the mobility network, a second query for determining whether the WUT should switch from being connected to the mobility network to being connected to one of the identified WLANs. In one embodiment, an associated method is provided.

In one embodiment, an apparatus includes a processor and a memory, the processor configured to: in response to a first query received at a network element of a mobility network from a wireless user terminal (WUT), determine whether the WUT should perform a scan for identifying Wireless Local Area Networks (WLANs) available for providing wireless access to the WUT; and in response to a second query received at the network element of the mobility network from the WUT, determine whether the WUT should switch from being connected to the mobility network to being connected to a WLAN available for providing wireless access to the WUT. In one embodiment, an associated method is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

In general, a wireless access selection capability is depicted and described herein, although various other capabilities also may be presented herein.

In at least some embodiments, the wireless access selection capability enhances existing static wireless access selection by enabling dynamic wireless access selection for wireless user terminals.

In at least some embodiments, for a wireless user terminal, the wireless access selection capability enables, via interaction by the wireless user terminal with a mobility network (e.g., a Third Generation (3G) cellular network, a Fourth Generation (4G) cellular network, and the like), a determination as to whether the wireless user terminal should remain connected via the mobility network or should switch to using a local wireless access technology (e.g., a Wireless Local Area Network (WLAN)).

In at least some embodiments, the interaction by the wireless user terminal with the mobility network may include two queries initiated by the wireless user terminal via the mobility network, including a first query for determining whether the wireless user terminal should perform a scan for identifying WLANs available for providing wireless access to the wireless user terminal and a second query for determining whether the wireless user terminal should switch from being connected to the mobility network to being connected to an identified WLAN identified during a WLAN scan initiated by the wireless user terminal. In this manner, at least some embodiments of the wireless access selection capability enable a wireless user terminal to account for two relatively important functions associated with WLAN selection, including: (1) a determination as to whether the wireless user terminal should use wireless user terminal resources (e.g., processor, battery, and the like) to scan for a WLAN in the hope of locating better service and (2) when one or more WLANs are located by the wireless user terminal, a determination as to whether the wireless user terminal should connect to an identified WLAN and, if so, an associated determination as to which of the WLANs the wireless user terminal should connect.

In at least some embodiments, the wireless access selection capability involves the service provider in the real-time wireless access selection process by using a broader network-level view that is not available at wireless user terminals using existing static wireless access selection mechanisms. In at least some such embodiments, the broader network-level view may include information such as relative network availability/capability information (e.g., availability of wireless access points within the geographic area of the wireless user terminal, throughput capabilities, security capabilities, and the like) between available wireless access networks (e.g., between the mobility network and one or more WLANs available for providing wireless access for the wireless user terminal), relative network performance information (e.g., network element processor occupancy information for one or more network elements of the mobility network and/or WLANs, dropped packet rates, throughput information, and the like, as well as various combinations thereof) between available wireless access networks, and the like, as well as various combinations thereof.

Although primarily depicted and described herein with respect to providing various embodiments of the wireless access selection capability within a particular type of communication network (illustratively, a network including a particular type of mobility network and particular type of local wireless access network), it will be appreciated that various embodiments of the wireless access selection capability may be provided using any various other suitable types of communication networks.

Figure 1:
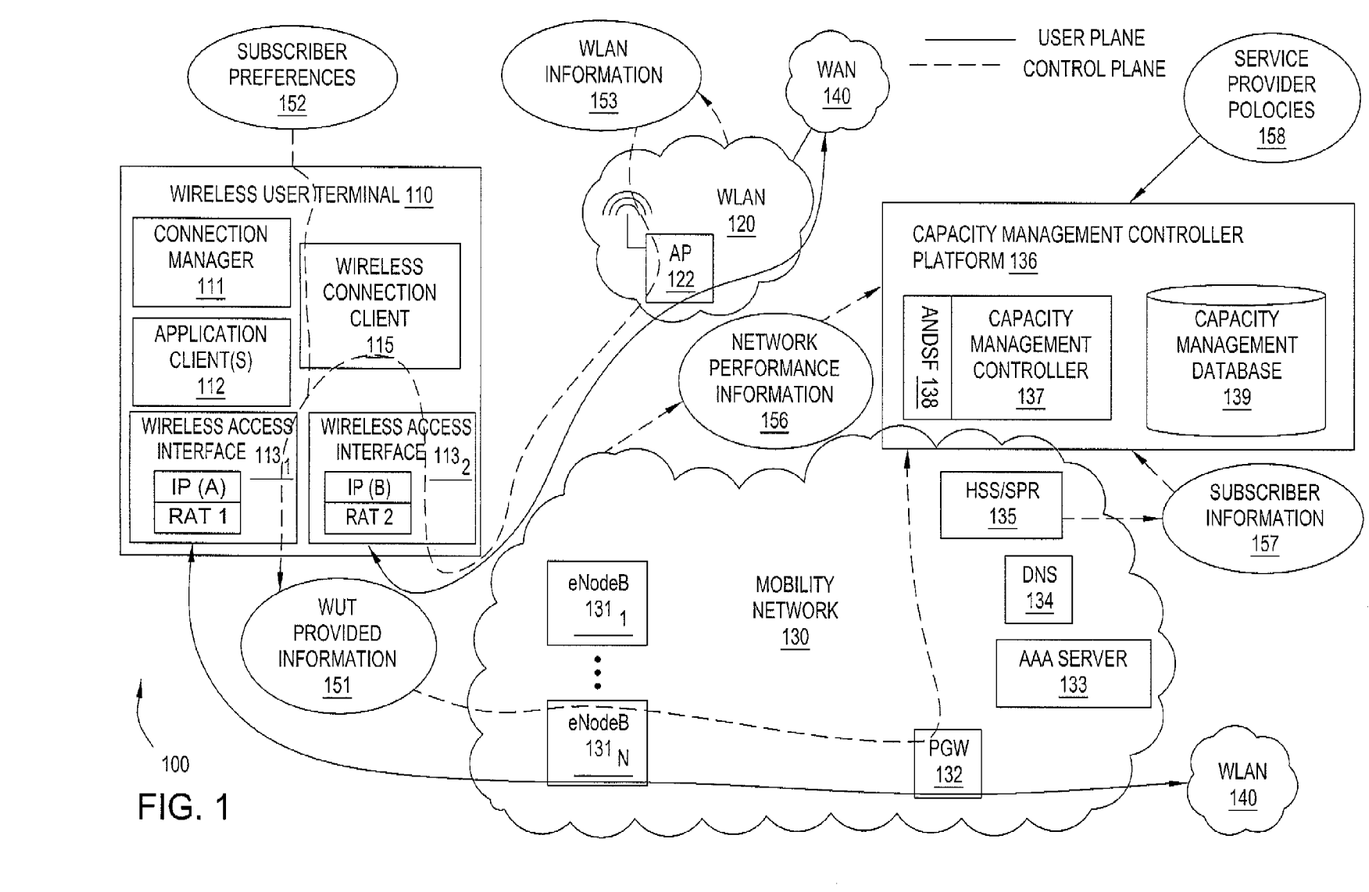
FIG. 1 depicts an exemplary communication system illustrating one embodiment of a wireless access selection capability.

FIG. 1 depicts an exemplary communication system illustrating one embodiment of a wireless access selection capability.

The exemplary communication system 100 includes a wireless user terminal (WUT) 110, a Wireless Local Area Network (WLAN) 120, a mobility network (MN) 130, and a Wide Area Network (WAN) 140.

The WUT 110 may be any mobile device configured to communicate using both local wireless communications (illustratively, WLAN 120) and cellular wireless communications (illustratively, MN 130). For example, the WUT 110 may be a laptop computer, a tablet computer, a smart phone, or any other similar device.

The WUT 110 may be implemented in any manner suitable for enabling WUT 110 to access WLAN 120 and MN 130. In one embodiment, for example, WUT 110 includes a connection manager (CM) 111, a plurality of application clients (ACs) $112_1$-$112_N$ (collectively, ACs 112), and a pair of wireless access interfaces (WAIs) $113_1$ and $113_2$ (collectively, WAIs 113). The WAIs 113 provide respective interfaces via which WUT 110 may interface with MN 130 (illustratively, using a first IP address (A) associated with a first Radio Access Technology (RAT1)) and WLAN 120 (illustratively, using a second IP address (B) associated with a second Radio Access Technology (RAT2)), respectively. As depicted in FIG. 1, WAI $113_1$ provides a wireless interface for MN 130 and WAI $113_2$ provides a wireless interface for WLAN 120. The ACs 112 may be application clients for any type(s) of applications which may be run on a WUT 110, each of which may be configured to access one or both of WAI $113_1$ (i.e., for communications via MN 130) and WAI $113_2$ (i.e., for communications via WLAN 120). The CM 111 is configured to manage use of WAIs 113 by ACs 112. As depicted in FIG. 1, the WUT 110 also includes a Wireless Connection Client (WCC) 115 that is configured to provide various functions of the wireless access selection capability.

The WLAN 120 provides local wireless access for WUTs, for enabling WUTs to access WAN 140. As depicted in FIG. 1, WLAN 120 includes an Access Point (AP) 122 configured to provide wireless access for WUTs and backhaul to WAN 140. For example, AP 122 may provide a wireless hotspot via which WUTs may access WAN 140. The WLAN 120 may be based on any suitable local wireless access technology, such as Wireless Fidelity (WiFi) or any other suitable local wireless access technology. Although a single WLAN 120 is depicted and described with respect to FIG. 1 (for purposes of clarity), it will be appreciated that multiple WLANs may be available within the vicinity of WUT 110, thereby providing WUT 110 with multiple WLANs available for providing wireless access to WUT 110.

The MN 130 provides cellular wireless access for WUTs, for enabling WUTs to access WAN 140. The MN 130 may be any suitable type of cellular network. For example, MN 130 may be a Third Generation (3G) network, a Fourth Generation (4G) network, and the like. Similarly, MN 130 may be a Third Generation (3G) Partnership Project (3GPP) network, 3GPP2 network, and the like. In other words, MN 130 may be any suitable type of cellular wireless network. The MN 130 is operated by a network service provider.

The MN 130 provides cellular wireless service to WUTs and, thus, includes a communications infrastructure for supporting wireless access by WUTs and for supporting communications between WUTs and WAN 140. For purposes of clarity, MN 130 is depicted and described as being a Long Term Evolution (LTE) network, although it will be appreciated that MN 130 may be any suitable type of mobility network. For example, as depicted in FIG. 1, MN 130 includes a plurality of eNodeBs $131_1$-$131_N$ (collectively, eNodeBs 131), a Packet Data Network (PDN) Gateway (PGW) 132, an Authentication, Authorization, Accounting (AAA) server 133, a Domain Name Server (DNS) 134, a Home Subscriber Server/Subscriber Profile Repository (HSS/SPR) 135, and a Capacity Management Controller Platform (CMCP) 136. In one embodiment, CMCP 136 includes a Capacity Management Controller (CMC) 137 and a Capacity Management Database (CMD) 139. It is noted that MN 130 also includes various other network elements that provide additional communications infrastructure for MN 130 (e.g., Serving Gateways (SGWs), Mobility Management Entities (MMEs), Policy and Charging Rules Functions (PCRFs), and the like, as well as various combinations thereof), which are omitted for purposes of clarity.

The eNodeBs 131 are cellular wireless access points via which WUT 110 may access MN 130 (and may be referred to more generally as base stations). The eNodeBs 131 each support wireless communication of control plane and user plane traffic between WUT 110 and MN 130.

The PGW 132 supports communication of control plane and user plane traffic, and may support functions such as policy enforcement, packet filtering, charging support, and the like. The PGW 132 is configured to provide connectivity to WAN 140 and, thus, supports communication of user plane traffic between WUT 110 and WAN 140. The PGW 132 is configured for supporting communication of control traffic between WUT 110 and CMCP 136 (e.g., control information provided from WUT 110 to CMCP 136 for use in by CMCP 136 in answering queries provided from WUT 110, queries provided from WUT 110 to CMCP 136, query responses provided from CMCP 136 to WUT 110, and the like). The PGW 132 may provide various other functions.

The AAA server 133 provides authentication, authorization, and accounting (AAA) functions. For example, AAA server 133 is configured to authenticate WUT 110 when WUT 110 accesses MN 130.

The DNS 134 provides domain name service functions. For example, DNS 134 is configured to provide an address of CMC 137 to WUT 110 for enabling WUT 110 and CMC 137 to interact for providing various functions of the wireless access selection capability.

The HSS/SPR 135 stores subscriber profiles for subscribers of WUTs authorized to access the MN 130. In general, a subscriber profile for a subscriber may include subscriber information such as account information of the subscriber (e.g., personal information, plan(s) subscribed to by the subscriber, billing and payment information, and the like), information associated with the WUT of the subscriber, information indicative of services that the subscriber is authorized to use, current location information of the subscriber, call handling settings for the subscriber, and the like, as well as various combinations thereof. The HSS/SPR 135 may be referred to more generally as a subscriber database, and may be implemented in any other suitable manner.

The CMCP 136 is a platform configured for providing various functions of the wireless access selection capability. As noted above, the CMCP 136 includes CMC 137 and CMD 139, although it will be appreciated that CMCP 136 may be implemented in any other suitable manner.

The CMC 137 is configured to receive access selection control information and control storage of the received access selection control information in CMD 139. The CMC 137 also is configured to receive queries from WUTs and respond to queries from WUTs. In one embodiment, CMC 137 supports an Access Network Discovery and Selection Function (ANDSF) 138, where the ANDSF 138 is implemented as a modified version of the ANDSF standardized by the 3GPP (e.g., at least a portion of the wireless access selection capability may be implemented as an enhancement to the 3GPP-standardized ANDSF).

The CMD 139 is configured to store access selection control information for use by CMC 137 in evaluating queries received from WUTs. The types and flow of access selection control information, which may be used by CMC 137 and which may be stored in CMD 139, are depicted and described with respect to FIG. 1.

As depicted in FIG. 1, the access selection control information includes information provided from WUTs to CMCP 136 (denoted as WUT Provided Information 151).

The WUT Provided Information 151 includes subscriber preferences which may be entered by one or more subscribers via WUT 110 and propagated to CMC 137 via MN 130 (denoted as Subscriber Preferences 152).

The WUT Provided Information 151 includes WLAN information associated with WLANs (e.g., WLAN 120). The WLAN information includes, for each WLAN, information such as the geographic location of the WLAN, WLAN capability information for the WLAN (e.g., WiFi technology type supported, security available within the WLAN, and the like), WLAN performance information for the WLAN (e.g., throughput number of users attached, and the like), and the like, as well as various combinations thereof. This is denoted as WLAN Information 153. It is noted that, although depicted and described with respect to WLAN Information 153 which is associated only with the exemplary WLAN 120, WUTs may receive WLAN information for many WLANs and provide the WLAN information to CMC 137 such that CMC 137 has access to WLAN information for some or all of the WLANs which may be accessed by WUTs in accordance with the wireless access selection capability (and, where such WLAN information is maintained in CMD 139, such that CMD 139 becomes a repository of WLAN information for some or all of the WLANs which may be accessed by WUTs in accordance with the wireless access selection capability). In one embodiment, WLAN information for each WLAN has a timestamp associated therewith, which may be used to indicate the freshness/staleness of the WLAN information.

The WUT Provided Information 151 may include any other suitable information which may be provided from WUTs to CMC 137 for use in providing various functions of the wireless access selection capability.

The WUT Provided Information 151 may be provided from WUTs to CMC 137 at any suitable time and in any suitable manner (e.g., periodically, in response to entry of subscriber preferences, following completion of WLAN scans, following disconnection of WUTs from WLANs, as part of first queries and/or second queries initiated by WUTs, in response to requests from CMC 137, and the like, as well as various combinations thereof).

As depicted in FIG. 1, the access selection control information also includes information provided to CMCP 136 from sources other than the WUTs (illustratively, Network Performance Information 156, Subscriber Information 157, and Service Provider Policies 158).

The Network Performance Information 156 may include information indicative of the performance of MN 130 (e.g., network element processor occupancy of one or more network elements of MN 130, dropped packet rate, throughput, number of users waiting for service, queue depths, air interface utilization factor, and the like, as well as various combinations thereof). The Network Performance Information 156 may be provided to CMC 137 from any suitable source(s) of such information (e.g., access nodes (illustratively, eNodeBs 131), SGWs, PGWs (illustratively, PGW 132), routers, one or more network management systems providing management functions for MN 130, and the like, as well as various combinations thereof).

The Subscriber Information 157 may include any subscriber information which may be stored within MN 130 (e.g., subscriber account information, subscriber plan information, and the like, as well as various combinations thereof). The Subscriber Information 157 may be provided to CMC 137 from any suitable source(s) of such information (e.g., HSS/SPR 135).

The Service Provider Policies 158 may include any service provider policies which may be used in controlling wireless access selection for WUTs. The Service Provider Policies 158 may be provided to CMC 137 from any suitable source(s) of such information (e.g., entered by service provider technicians via CMCP 136 and/or one or more management systems, received from a Policy and Charging Rules Function (PCRF) and/or other element(s) associated with MN 130, and the like, as well as various combinations thereof).

The access selection control information provided to CMCP 136 from sources other than the WUTs also may include any other suitable types of information which may be used for providing various functions of the wireless access selection capability.

Although primarily depicted and described herein with respect to embodiments in which all of the access selection control information is stored in CMD 139, it is noted that, in at least some embodiments, at least a portion of the access selection control information depicted and described herein may not be stored in CMD 139, in which case CMC 137 may query one or more other devices for such information. In one embodiment, for example, rather than storing Network Performance Information 156 in the CMD 139, CMC 137 may query one or more network elements and/or management systems associated with MN 130 to retrieve Network Performance Information 156 when such information is needed (e.g., when determining a response to a second query initiated from WUT 110). In one embodiment, for example, rather than storing Subscriber Information 157 in the CMD 139, CMC 137 may query the HSS/SPR 135 to retrieve Subscriber Information 157 when such information is needed (e.g., when determining a response to a second query initiated from WUT 110).

The WCC 115 of the WUT 110 and the CMCP 136 of the MN 130 are configured to support two types of queries by which MN 130 is able to control wireless access selection by WUT 110 or at least aid WUT 110 in the wireless access selection process (e.g., enabling WUT 110 to determine whether to remain connected via MN 130 or to switch to connecting via a WLAN (e.g., WLAN 120 or any other suitable WLAN)). The CMCP 136 has access to information not available locally on WUT 110 and, as a result, use of the two types of queries by WUT 110 in the wireless access selection process enables more intelligent wireless access selection by WUT 110.

In a first query initiated by the WUT 110, the WUT 110 asks the MN 130 (e.g., CMC 137) whether or not the WUT 110 should initiate a WLAN scan for identifying WLANs available for providing wireless access to WUT 110 (or for information for use by WUT 110 in determining whether or not WUT 110 should initiate a WLAN scan for identifying WLANs available for providing wireless access to WUT 110). It is noted that, in the absence of the wireless access selection capability, WUT 110 would initiate a WLAN scan irrespective of whether or not there are any suitable WLANs available for providing wireless access to the WUT 110, which would waste battery power of the WUT 110 in any case where no suitable WLANs are available for providing wireless access to the WUT 110. The first query may be sent at any suitable time, such as when the WUT 110 would otherwise initiate a WLAN scan in the absence of the wireless access selection capability, when the WUT 110 is active on a mobility network connection (e.g., in the ECM-connected state in an LTE network) so as to reduce consumption of resources of the WUT 110 and MN 130, and the like. The CMC 137, upon receiving the first query from WUT 110, may determine whether there is an acceptable WLAN(s) available for providing wireless access to the WUT 110. This determination may be performed using WLAN Information 153. For example, this determination may include comparing the current location of WUT 110 (e.g., received from WUT 110 as part of the first query) to WLAN information indicative of the geographic locations of WLAN APs for determining if there are any WLANs available for providing wireless access for WUT 110. For example, this determination also may include analysis of other WUT Provided Information 151 (e.g., information indicative of the quality of service available on the WLANs from WLAN Information 152, information indicative of subscriber preferences from Subscriber Preferences 152, and the like, as well as various combinations thereof). The first query response from CMC 137 may indicate whether or not the WUT 110 should initiate a WLAN scan or may include information for use by WUT 110 in determining whether or not the WUT 110 should initiate a WLAN scan. In cases where a decision is made not to scan for WLANs, the WUT 110 will have saved battery resources. In one embodiment, if WLAN Information 153 does not include any information for the geographic area in which WUT 110 is located, the first query response from CMC 137 may indicate that WUT 110 should perform a WLAN scan. In one embodiment, for example, if a timestamp associated with WLAN Information 153 indicates that the WLAN information is stale, the first query response from CMC 137 may indicate that WUT 110 should perform a WLAN scan. The first query may be better understood by way of reference to FIGS. 2 and 3.

In a second query initiated by the WUT 110, the WUT 110 asks the MN 130 (e.g., CMC 137) whether or not the WUT 110 should connect to a WLAN identified during the WLAN scan performed by the WUT 110 (or for information for use by WUT 110 in determining whether or not WUT 110 should connect to a WLAN identified during the WLAN scan performed by the WUT 110). The second query may include WLAN information associated with WLANs identified by WUT 110 during the WLAN scan (e.g., AP signal strength for each WLAN, AP performance information for each WLAN, AP security information for each WLAN, and the like). The CMC 137, upon receiving the second query from WUT 110, may determine whether or not the WUT 110 should connect to a WLAN rather than remaining connected to MN 130. The CMC 137 may evaluate various types of information in determining whether or not the WUT 110 should connect to a WLAN (e.g., WLAN Information 152 received from the WUT 110 and/or available from CMD 139, Subscriber Preferences 153 received from the WUT 110 and/or available from CMD 139, Network Performance Information 156 received from MN 130 and/or available from CMD 139, Subscriber Information 157 received from HSS/SPR 135 and/or available from CMD 139, Service Provider Policies 158 available from CMD 139, and the like, as well as various combinations thereof). The second query response from CMC 137 may indicate whether or not the WUT 110 should connect to a WLAN or may include information for use by WUT 110 in determining whether or not the WUT 110 should connect to a WLAN. In cases where a decision is made to connect to a WLAN, the WUT 110 may be configured to automatically connect to the WLAN or may prompt the subscriber to provide an indication as to whether or not to connect to the WLAN. The second query may be better understood by way of reference to FIGS. 2 and 3.

Figure 2:
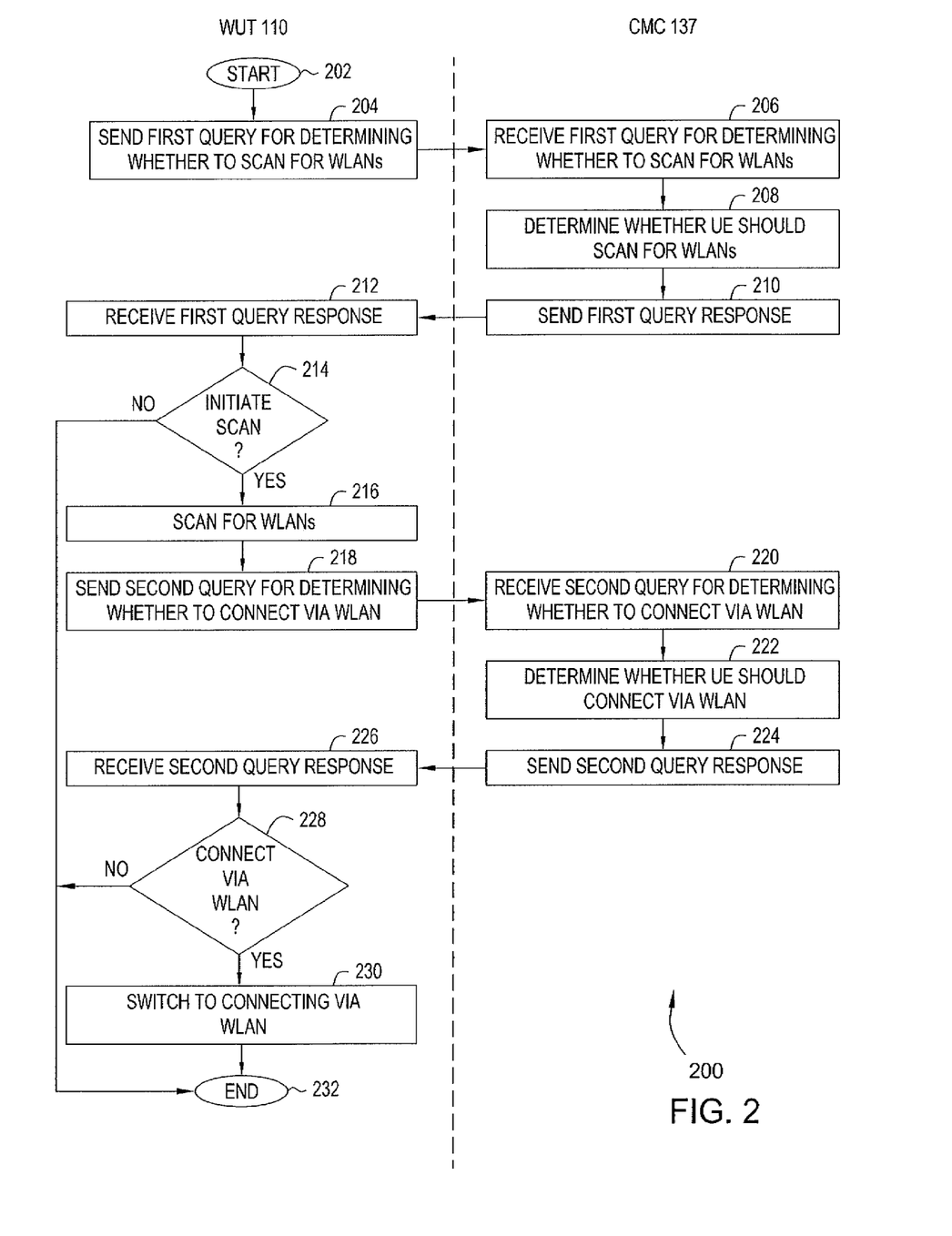
FIG. 2 depicts one embodiment of a method for determining whether to switch from a mobility network to a WLAN within the context of the exemplary communication system of FIG. 1.

FIG. 2 depicts one embodiment of a method for determining whether to switch from a mobility network to a WLAN within the context of the exemplary communication system of FIG. 1.

At step 202, method 200 begins.

At step 204, the WUT 110 sends a first query for determining whether the WUT 110 should initiate a scan for WLANs.

At step 206, the CMC 137 receives the first query for determining whether the WUT 110 should initiate a scan for WLANs.

At step 208, the CMC 137 determines whether the WUT 110 should initiate a scan for WLANs. In one embodiment, the CMC 137 determines whether the WUT 110 should initiate a scan for WLANs by determining whether any WLANs are available near the geographic location of WUT 110 for providing wireless access for WUT 110. The CMC 137 also may evaluate other types of information for determining whether the WUT 110 should initiate a scan for WLANs, as described herein with respect to FIG. 1.

At step 210, the CMC 137 sends a first query response to WUT 110. In one embodiment, the first query response provides an indication as to whether or not the WUT 110 should initiate a scan for WLANs (e.g., where the CMC 137 makes the decision on behalf of the WUT 110). In one embodiment, the first query response includes information which may be analyzed by WUT 110 in determining whether or not the WUT 110 should initiate a scan for WLANs (e.g., information that the WUT 110 may evaluate, by itself or in combination with other information available to the WUT 110, for determining whether or not the WUT 110 should initiate a scan for WLANs).

At step 212, the WUT 110 receives the first query response from CMC 137.

At step 214, the WUT 110 determines, using the first query response, whether to initiate a scan for WLANs. If a determination is made not to initiate a scan for WLANs, method 200 proceeds to step 232 where method 200 ends. If a determination is made to scan for WLANs, method 200 proceeds to step 216.

At step 216, the WUT 110 initiates a scan for identifying WLANs. The scan for identifying WLANs may be performed in any suitable manner. For purposes of describing method 200, it is assumed that at least one WLAN is identified during the scan; however, it will be appreciated that if no WLANs are identified during the scan, method 200 may then perform any suitable action (e.g., method 200 may proceed to step 232 where method 200 ends, method 200 may return to step 204 immediately or after a period of time for determining whether or not WUT 110 should reattempt the scan for WLANs, method 200 may remain at step 216 and reinitiate a scan for WLANs immediately or after a period of time, and the like).

At step 218, the WUT 110 sends a second query for determining whether to connect via a WLAN (rather than remaining connected via MN 130). The determination as to whether to connect via a WLAN is a determination as to whether to connect via one of the WLANs identified during the WLAN scan performed by WUT 110.

At step 220, the CMC 137 receives the second query for determining whether the WUT 110 should connect via a WLAN.

At step 222, the CMC 137 determines whether the WUT 110 should connect via a WLAN. In one embodiment, the CMC 137 determines whether the WUT 110 should connect via a WLAN by evaluating one or more of network capability information associated with the access networks (e.g., MN 130 and one or more WLANs identified by WUT 110), network performance information associated with the access network (e.g., MN 130 and one or more WLANs identified by WUT 110), subscriber information associated with the subscriber of WUT 110 (e.g., subscriber profile information, subscriber preference information, and the like), service provider policy information of the service provider of MN 130, and the like, as well as various combinations thereof). The CMC 137 also may evaluate other types of information for determining whether the WUT 110 should connect via a WLAN, as described herein with respect to FIG. 1.

At step 224, the CMC 137 sends a second query response to WUT 110. In one embodiment, the second query response provides an indication as to whether or not the WUT 110 should connect via a WLAN. In one embodiment, the second query response includes information which may be analyzed by WUT 110 in determining whether or not the WUT 110 should connect via a WLAN (e.g., information that the WUT 110 may evaluate, by itself or in combination with other information available to the WUT 110, for determining whether or not the WUT 110 should connect via a WLAN).

At step 226, the WUT 110 determines, using the second query response, whether the WUT 110 should connect via a WLAN. If a determination is made not to connect via a WLAN, method 200 proceeds to step 232 where method 200 ends. If a determination is made to connect via a WLAN, method 200 proceeds to step 230.

At step 230, the WUT 110 initiates a process for connecting via a WLAN (i.e., switching from being connected via the mobility network to being connected via a WLAN). It is noted that where multiple WLANs are identified by WUT 110 during the WLAN scan, one of the identified WLANs is selected as the WLAN to which the WUT 110 connects. In one embodiment, this decision is made by CMC 137 and reported to WUT 110 (e.g., as part of the second query response or separate from the second query response). In one embodiment, this decision is made by the WUT 110. In any event, the WUT 110 connects via a WLAN and may access WAN 140 via the WLAN after connection to the WLAN is completed.

At step 232, method 200 ends. Although depicted and described as ending (for purposes of clarity), it is noted that the WUT 110 may switch from the WLAN to another network if necessary or desired (e.g., to a different WLAN, back to a mobility network, and the like).

Figure 3:
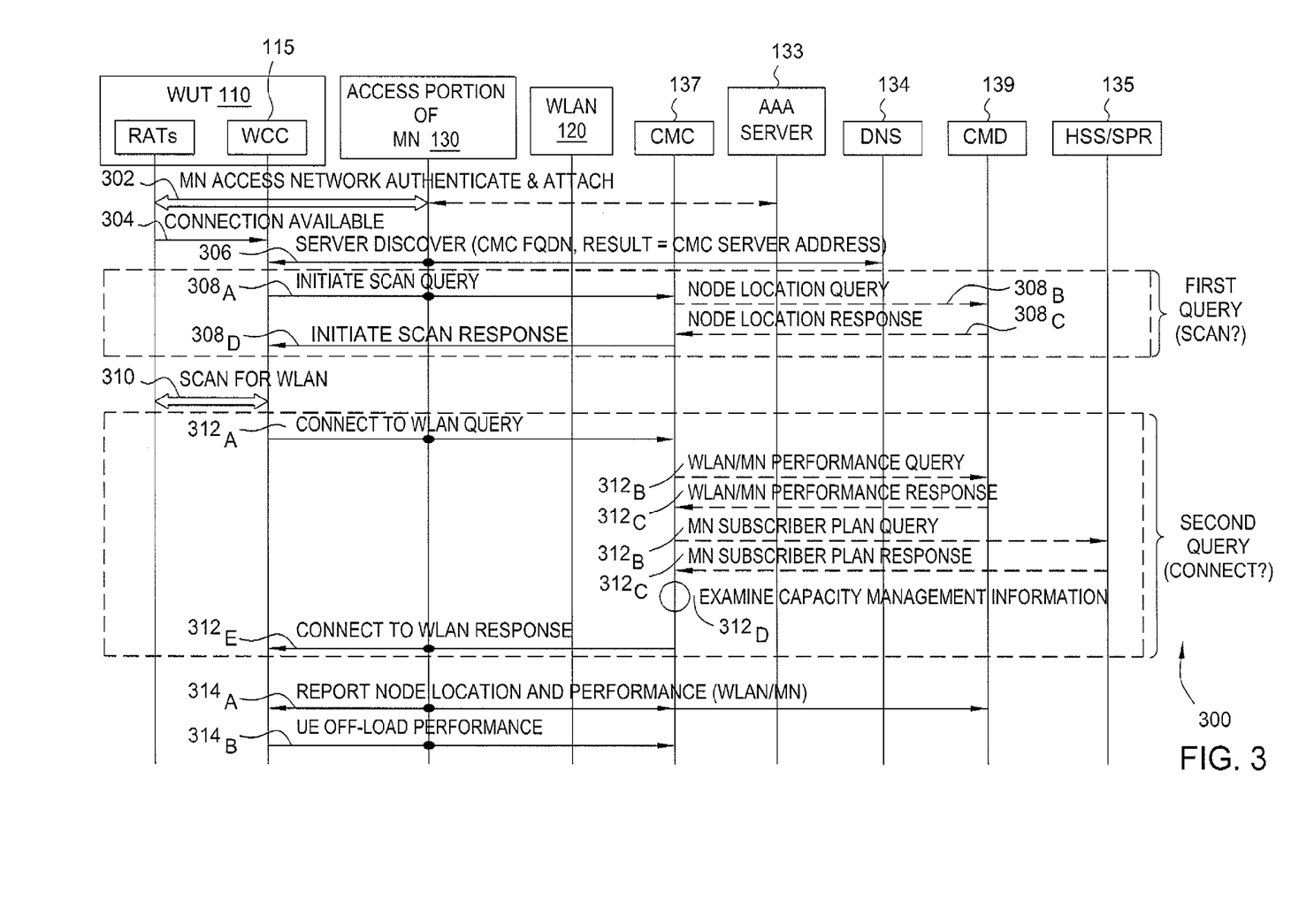
FIG. 3 depicts one embodiment of a message flow for determining whether to switch from a mobility network to a WLAN within the context of the exemplary communication system of FIG. 1.

FIG. 3 depicts one embodiment of a message flow for determining whether to switch from a mobility network to a WLAN within the context of the exemplary communication system of FIG. 1.

At step 302, RAT1 of NAI 113 on WUT 110 communicates with an access network portion of MN 130 for authenticating with MN 130 and attaching to MN 130. This may include communication between the access network portion of MN 130 and AAA server 133, such that AAA server 133 may perform authentication and authorization functions for enabling WUT 110 to access MN 130.

At step 304, RAT1 of NAI 113 on WUT 110 informs WCC 115 of WUT 110 that a connection to MN 130 is available for use by WUT 110.

At step 306, WCC 115 of WUT 110 initiates a CMC server discovery process, via an access network portion of MN 130 to DNS 134, in order to determine the address of CMC 137. In one embodiment, for example, the WCC 115 of WUT 110 initiates a query to DNS 134 that includes a Fully Qualified Domain Name (FQDN) of CMC 137, and the DNS 134 responds to the query by providing the address of CMC 137 to WCC 115 of WUT 110.

At step 308, WCC 115 of WUT 110 initiates a first query for determining whether or not WUT 110 should initiate a scan for WLANs, which may include a number of associated steps. At step $308_A$, the WCC 115 of WUT 110 initiates an Initiate Scan Query which is sent to CMC 137 via an access network portion of MN 130. At step $308_B$, the CMC 137 initiates a Node Location Query which is sent to CMD 139. The Node Location Query may include the geographic location of the WUT 110 for use in retrieving a list of WLANs located within the geographic vicinity of WUT 110. At step $308_C$, the CMD 139 sends a Node Location Response to CMC 137. The Node Location Response may include a list of WLANs located within the geographic vicinity of WUT 110. At step $308_D$, the CMC 137 sends an Initiate Scan Response to WCC 115 of WUT 110.

At step 310, WCC 115 of WUT initiates a scan for WLANs, and identifies one or more WLANs available for providing wireless access to WUT 110. It is noted that an assumption is made that a determination is made to initiate a scan for WLAN. It is further noted that an assumption is made that at least one WLAN is identified during the WLAN scan.

At step 312, WCC 115 of WUT 110 initiates a second query for determining whether or not WUT 110 should connect to a WLAN, which may include a number of associated steps. At step $312_A$, the WCC 115 of WUT 110 initiates a Connect-to-WLAN Query which is sent to CMC 137 via an access network portion of MN 130. At step $312_B$, the CMC 137 initiates two queries as follows: (1) an Access Network Performance Query which is sent to CMD 139 for retrieving network performance information for the MN 130 and each WLAN identified during the WLAN scan (illustratively, WLAN 120) and (2) a Subscriber Plan Query which is sent to HSS/SPR 135 for retrieving subscriber information associated with the subscriber of WUT 110. At step 312c, the CMC 137 receives two query responses as follows: (1) an Access Network Performance Response which is sent from CMD 139 to CMC 137 and includes network performance information for the MN 130 and each WLAN identified during the WLAN scan (illustratively, WLAN 120) and (2) a Subscriber Plan Response which is sent from HSS/SPR 135 to CMC 137 and includes subscriber information associated with the subscriber of WUT 110. At step $312_D$, the CMC 137 evaluates the received access selection control information for determining a response to the second query initiated by WCC 115 of WUT 110. At step $312_E$, the CMC 137 sends a Connect-to-WLAN Response to WCC 115 of WUT 110. The WCC 115 of WUT 110 then determines, using the Connect-to-WLAN Response, whether or not to connect to one of the WLANs identified during the WLAN scan.

At step 314, WCC 115 of WUT 110 reports information CMC 137 which may be stored in CMD 139 for use in responding to queries from WUT 110 and/or other WUTs. At step 314$_A$, for example, WLAN information is reported from WCC 115 of WUT 110 to CMC 137, which then provides the WLAN information to CMD 139 for storage therein. As noted above, the WLAN information may include, for each WLAN, a geographic location of the WLAN, WLAN performance information, and the like, as well as various combinations thereof. Although depicted and described as being provided as part of step 314$_A$, it is noted that some or all of such WLAN information alternatively and/or also may be provided as part of step 308$_A$ and/or step 312$_A$. At step 314B, for example, WUT off-load performance information may be reported from WCC 115 of WUT 110 to CMC 137, which then stores the WUT off-load performance information. The WUT off-load performance information may include throughput information (e.g., peak, average, and so forth), signal strength information, WLAN congestion information, air interface occupancy information, information indicative of the number of attached users, and the like, as well as various combinations thereof).

Although primarily depicted and described herein with respect to embodiments in which a new component on the WUT 110 (illustratively, WCC 115) provides functions of the wireless access selection capability, it is noted that some or all of the functions of WCC 115 may be distributed across multiple new elements, may be implemented on one or more existing element (e.g., CM 111), and the like, as well as various combinations thereof.

It is noted that various embodiments of the wireless access selection capability including the first and second queries provide various capabilities and advantages. For example, various embodiments of the wireless access selection capability including the first and second queries allows for use of network intelligence that varies over time (e.g., mobility network congestion level, WLAN performance, and the like), thereby (1) enabling the mobility network to indicate to the WUT whether or not certain WLANs are likely to provide good service (which may prevent the WUT from attaching to a WLAN AP that does not provide adequate throughput) and (2) enabling weighing of dynamic information (e.g., mobility network congestion levels, network loading due to activity of individual subscribers, subscriber mobility, and the like) when deciding whether the WUT is to remain on the mobility network or switch to a WLAN. Similarly, for example, various embodiments of the wireless access selection capability (1) enable the cellular service provider to control or influence wireless access selection for a WUT (including wireless access technology selection and wireless access network selection) while taking into account network congestion levels and the loading that individual users are imposing on the MN 130, (2) allow these factors to be weighed in view of the alternative service options available as well as the quality of service available for those respective alternative service options, and (3) allow these factors to be weighed in view of one or more other relevant factors (e.g., WUT mobility level, subscriber subscriptions to operator services, service plan levels of subscribers, subscriber preferences, and the like, as well as various combinations thereof). The wireless access selection capability provides various other capabilities and advantages.

As described herein, the wireless access selection capability provides advantages to subscribers and service providers. For service providers, for example, the wireless access selection capability enables the service provider to better manage network loading, allowing wireless access selection to be based on the relative performance available on the service provider mobility network and WLANs available to the subscribers while also taking into account factors such as individual subscriber usage of services, subscriber mobility, and the like. For subscribers, for example, better wireless access selection decisions will be made without requiring constant involvement from the subscribers, subscriber quality-of-experience will be improved through better network connections and more consistent offering of network services, and WUT battery live will be preserved by reducing WLAN scanning performed by the WUT. It is noted that various other advantages may be realized through use of various embodiments of the wireless access selection capability.

Figure 4:
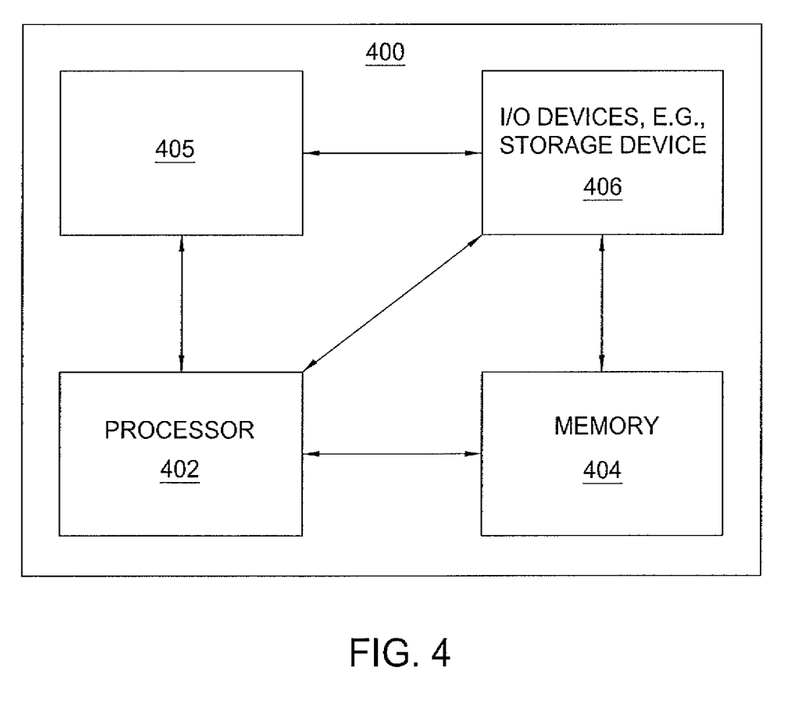
FIG. 4 depicts a high-level block diagram of a computer suitable for use in performing the functions described herein.

FIG. 4 depicts a high-level block diagram of a computer suitable for use in performing functions described herein.

As depicted in FIG. 4, computer 400 includes a processor element 402 (e.g., a central processing unit (CPU) and/or other suitable processor(s)) and a memory 404 (e.g., random access memory (RAM), read only memory (ROM), and the like). The computer 400 also may include a cooperating module/process 405 and/or various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or hardware (e.g., using a general purpose computer, one or more application specific integrated circuits (ASIC), and/or any other hardware equivalents).

It will be appreciated that the functions depicted and described herein may be implemented in software for executing on a general purpose computer (e.g., via execution by one or more processors) so as to implement a special purpose computer, and/or may be implemented in hardware (e.g., using one or more application specific integrated circuits (ASIC) and/or one or more other hardware equivalents).

In one embodiment, the cooperating process 405 can be loaded into memory 404 and executed by processor 402 to implement functions as discussed herein. Thus, cooperating process 405 (including associated data structures) can be stored on a computer readable storage medium, e.g., RAM memory, magnetic or optical drive or diskette, and the like.

It will be appreciated that computer 400 depicted in FIG. 4 provides a general architecture and functionality suitable for implementing functional elements described herein and/or portions of functional elements described herein. For example, the computer 400 provides a general architecture and functionality suitable for implementing one or more of WUT 110, AP 122, eNodeBs 131, PGW 132, AAA server 133, DNS 134, HSS/SPR 135, CMCP 136, CMC 137, CMD 139, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
send, from a wireless user terminal (WUT) toward a network element via a mobility network, a first query for determining whether the WUT should perform a scan for identifying Wireless Local Area Networks (WLANs) available for providing wireless access to the WUT;
initiate, based at least in part on a first query response indicative that the WUT should perform a scan for identifying WLANs, a scan for identifying one or more WLANs available for providing wireless access to the WUT;
send, from the WUT toward the network element via the mobility network, a second query for determining whether the WUT should switch from being connected to the mobility network to being connected to one of the identified WLANs;
receive, at the WUT, a second query response indicative of a determination by the network element that the WUT should switch from being connected to the mobility network to being connected to one of the identified WLANs;
determine, at the WUT responsive to the second query response and based on information available to the WUT, whether the WUT should switch from being connected to the mobility network to being connected to one of the identified WLANs; and
initiate, based on a determination by the WUT that the WUT should switch from being connected to the mobility network to being connected to one of the identified, switching of the WUT from being connected to the mobility network to being connected to one of the identified WLANs.

2. The apparatus of claim 1, wherein the processor is configured to:
prior to initiation of the scan for identifying one or more WLANs available for providing wireless access to the WUT:
determine, at the WUT responsive to the first query response and based on the information available to the WUT, whether the WUT should initiate the scan for identifying one or more WLANs available for providing wireless access to the WUT.

3. The apparatus of claim 1, wherein the processor is configured to:
receive, from the network element, an indication of a selection by the network element of one of a plurality of identified WLANs identified by the WUT during the scan.

4. The apparatus of claim 1, wherein, to initiate switching of the WUT from being connected to the mobility network to being connected to one of the identified WLANs, the processor is configured to:
select one of a plurality of identified WLANs identified by the WUT during the scan for identifying one or more WLANs available for providing wireless access to the WUT; and
initiate switching of the WUT from being connected to the mobility network to being connected to the selected one of the identified WLANs.

5. The apparatus of claim 1, wherein the information available to the WUT comprises at least one of subscriber preference information or WLAN information associated with at least one of the identified WLANs.

6. The apparatus of claim 1, wherein the processor is configured to:
propagate WLAN information toward the network element, wherein the WLAN information comprises, for each of at least one WLAN, at least one of a geographic location of the WLAN, security information associated with the WLAN, and performance information associated with the WLAN.

7. A method, comprising:
sending, by a processor of a wireless user terminal (WUT) toward a network element via a mobility network, a first query for determining whether the WUT should perform a scan for identifying Wireless Local Area Networks (WLANs) available for providing wireless access to the WUT;
initiating, based at least in part on a first query response indicative that the WUT should perform a scan for identifying WLANs, a scan for identifying one or more WLANs available for providing wireless access to the WUT;
sending, from the WUT toward the network element via the mobility network, a second query for determining whether the WUT should switch from being connected to the mobility network to being connected to one of the identified WLANs;
receiving, at the WUT, a second query response indicative of a determination by the network element that the WUT should switch from being connected to the mobility network to being connected to one of the identified WLANs;
determining, at the WUT responsive to the second query response and based on information available to the WUT, whether the WUT should switch from being connected to the mobility network to being connected to one of the identified WLANs; and
initiating, based on a determination by the WUT that the WUT should switch from being connected to the mobility network to being connected to one of the identified, switching of the WUT from being connected to the mobility network to being connected to one of the identified WLANs.

8. The method of claim 7, further comprising:
prior to initiation of the scan for identifying one or more WLANs available for providing wireless access to the WUT:
determining, at the WUT responsive to the first query response and based on the information available to the WUT, whether the WUT should initiate the scan for identifying one or more WLANs available for providing wireless access to the WUT.

9. The method of claim 7, further comprising:
receiving, from the network element, an indication of a selection by the network element of one of a plurality of identified WLANs identified by the WUT during the scan.

10. The method of claim 7, wherein initiating switching of the WUT from being connected to the mobility network to being connected to one of the identified WLANs comprises:
  selecting one of a plurality of identified WLANs identified by the WUT during the scan for identifying one or more WLANs available for providing wireless access to the WUT; and
  initiating switching of the WUT from being connected to the mobility network to being connected to the selected one of the identified WLANs.

11. The method of claim 7, wherein the information available to the WUT comprises at least one of subscriber preference information or WLAN information associated with at least one of the identified WLANs.

12. The method of claim 7, further comprising:
  propagating WLAN information toward the network element, wherein the WLAN information comprises, for each of at least one WLAN, at least one of a geographic location of the WLAN, security information associated with the WLAN, and performance information associated with the WLAN.

13. An apparatus, comprising:
  a processor and a memory communicatively connected to the processor, the processor configured to:
    determine, at a network element of a mobility network in response to a first query received at the network element from a wireless user terminal (WUT), whether the WUT should perform a scan for identifying Wireless Local Area Networks (WLANs) available for providing wireless access to the WUT;
    send, toward the WUT in response to the first query, a first query response indicative of whether the WUT should perform a scan for identifying WLANs available for providing wireless access to the WUT;
    determine, at the network element of the mobility network in response to a second query received at the network element from the WUT and based at least in part on subscriber information associated with a subscriber of the WUT, whether the WUT should switch from being connected to the mobility network to being connected to a WLAN available for providing wireless access to the WUT, wherein the processor is configured to determine whether the WUT should switch from being connected to the mobility network to being connected to a WLAN available for providing wireless access to the WUT based on at least one of network performance information associated with the mobility network and one or more WLANs identified as available for providing wireless access to the WUT or service provider policy information associated with a service provider of the mobility network; and
    send, toward the WUT in response to the second query, a second query response indicative of whether the WUT should switch from being connected to the mobility network to being connected to a WLAN available for providing wireless access to the WUT.

14. The apparatus of claim 13, wherein, to determine whether the WUT should perform a scan for identifying WLANs available for providing wireless access to the WUT, the processor is configured to:
  determine a geographic location of the WUT; and
  query a database of WLANs for determining whether any WLANs are available for providing wireless access to the WUT.

15. A method, comprising:
  determining, via a processor at a network element of a mobility network in response to a first query received at the network element from a wireless user terminal (WUT), whether the WUT should perform a scan for identifying Wireless Local Area Networks (WLANs) available for providing wireless access to the WUT;
  sending, toward the WUT in response to the first query, a first query response indicative of whether the WUT should perform a scan for identifying WLANs available for providing wireless access to the WUT;
  determining, at the network element of the mobility network in response to a second query received at the network element from the WUT and based at least in part on subscriber information associated with a subscriber of the WUT, whether the WUT should switch from being connected to the mobility network to being connected to a WLAN available for providing wireless access to the WUT, wherein determining whether the WUT should switch from being connected to the mobility network to being connected to a WLAN available for providing wireless access to the WUT is based on at least one of network performance information associated with the mobility network and one or more WLANs identified as available for providing wireless access to the WUT or service provider policy information associated with a service provider of the mobility network; and
  sending, toward the WUT in response to the second query, a second query response indicative of whether the WUT should switch from being connected to the mobility network to being connected to a WLAN available for providing wireless access to the WUT.

16. The method of claim 15, wherein determining whether the WUT should perform a scan for identifying WLANs available for providing wireless access to the WUT comprises:
  determining a geographic location of the WUT; and
  querying a database of WLANs for determining whether any WLANs are available for providing wireless access to the WUT.

* * * * *